B. J. PRIMMER AND J. L. HALSTEAD.
MACHINE FOR MAKING REINFORCED CONCRETE PIPE.
APPLICATION FILED MAR. 16, 1920.

1,400,457. Patented Dec. 13, 1921.
2 SHEETS—SHEET 1.

INVENTORS
B. J. Primmer
J. L. Halstead
By Hazard & Miller
Att'ys.

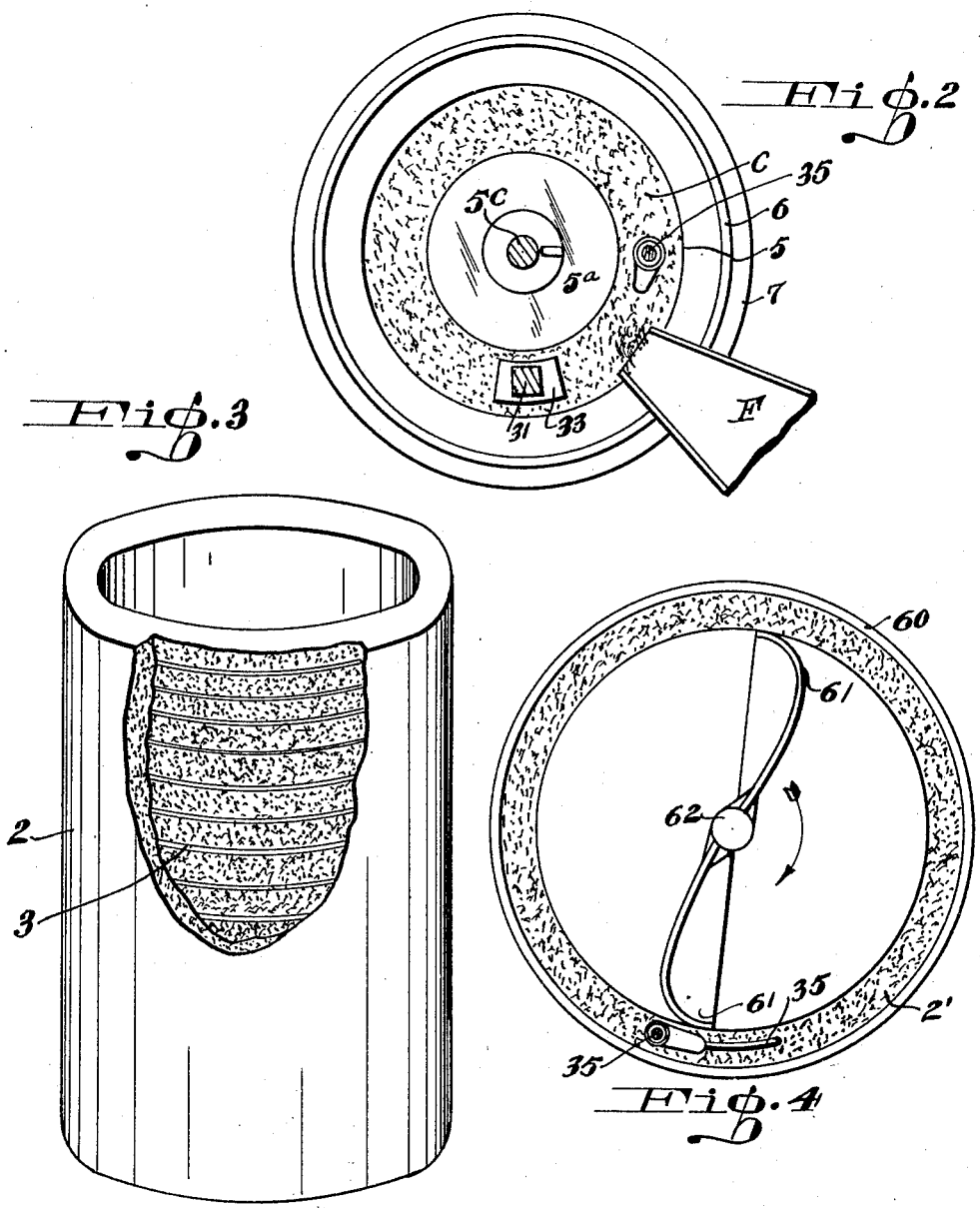

UNITED STATES PATENT OFFICE.

BURROWS J. PRIMMER AND JOSEPH L. HALSTEAD, OF LOS ANGELES, CALIFORNIA.

MACHINE FOR MAKING REINFORCED-CONCRETE PIPE.

1,400,457.       Specification of Letters Patent.       Patented Dec. 13, 1921.

Application filed March 16, 1920. Serial No. 366,341.

*To all whom it may concern:*

Be it known that we, BURROWS J. PRIMMER and JOSEPH L. HALSTEAD, citizens of the United States, residing at Los Angeles, in the county of Los Angeles and State of California, have invented new and useful Improvements in Machines for Making Re-inforced-Concrete Pipe, of which the following is a specification.

This invention relates to re-inforced concrete pipe, and a method for making the same and the invention has for an object to provide an easily practised method for rapidly laying re-inforcing wire or flexible metal member in a helical position in a tubular pipe as it is produced. The invention therefore consists of the improved method and its product and an apparatus for practising the same.

Fig. 2 is a cross-section on line 2—2 of Fig. 1.

Fig. 3 is a perspective of one of the tubes partly in section.

Fig. 4 is a plan view showing diagrammatically another form of apparatus in which the concrete tube may be formed.

Figure 1:
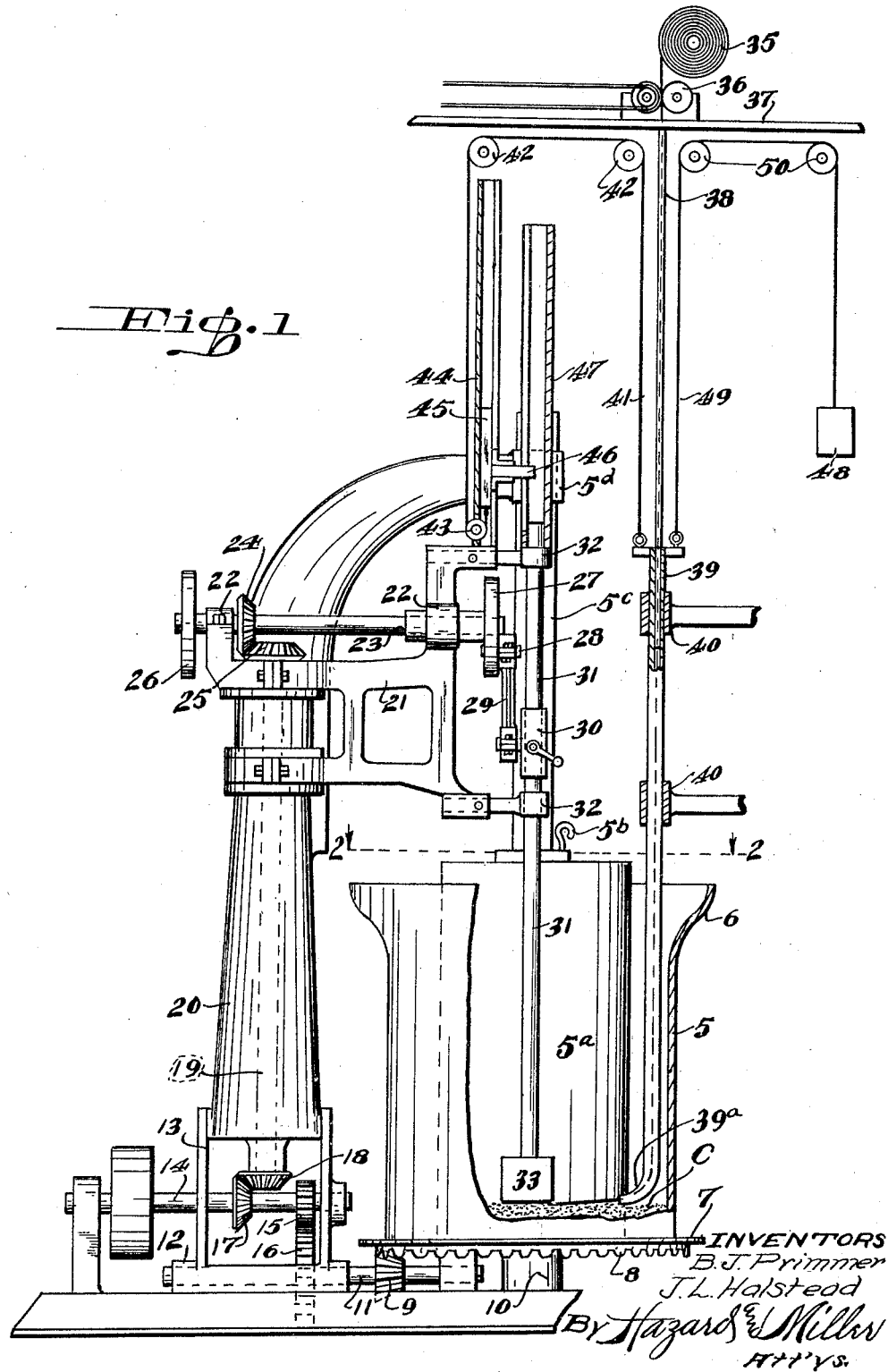
Figure 1 is a side elevation of an apparatus partly in section showing the method of forming one of the pipe sections.

The improved concrete pipe is illustrated in Fig. 3 as comprising a tubular section 2 of any suitable length and with walls of desired thickness and in the wall there is embedded a re-inforcing wire or rod 3. This wire is automatically laid helically in the tube body as the latter is formed and while the plastic cement is being tamped.

A form of apparatus by which the invention may be practised and the tube produced is illustrated as comprising an outer mold shell or chamber 5 that may have an outwardly flared top mouth 6 and is provided on a turn table 7 shown as having a gear 8 engaging a pinion 9 by which it may be driven. The turn-table 7 is rotative about a vertical bearing 10. The pinion 9 is secured on a shaft 11 in suitable bearings 12 of an appropriate frame 13 in which is mounted a counter shaft 14 for a pinion 15 engaging gear 16 secured on the shaft 11.

Also secured on the shaft 14 is a pinion 17 engaging a complementary gear 18 on a shaft 19 extending through a column 20 forming a part of the frame. On the head of the column is a cross frame 21 provided with bearings 22 carrying a shaft 23 having a gear 24 engaging a gear 25 on the upper end of the shaft 19. There may be secured on the shaft 23 a fly wheel 26 and on the inner end of the shaft is a disk 27 having a wrist 28 to which is connected a link 29 attached at its lower end to a slide 30.

This slide is mounted on and is designed to lift a tamper rod 31 slidable through bearings 32 on the cross frame 21. The tamp rod carries on its lower end a tamping block or shoe 33 which is prevented from having rotary movement by suitable means, as for instance, by making the rod 31 of non-circular cross-section and fitting the bearings 32 correspondingly.

The block 33 reciprocates between the outer wall 5 and an inner core 5ª also carried on the turn table 7 and between which and shell 5 there is formed the mold chamber which is filled with plastic cement C that may be introduced continuously while the turn table is being rotated and the tamper rod reciprocated and by the stamp or tamper 33 beaten down. The core 5ª is mounted on a center post 5ᶜ supporting an arm 5ᵈ of the frame. A feed chute F is shown in Fig. 2 arranged to discharge the cement into the chamber. The core 5ª is provided with a hook or other means 5ᵇ to facilitate removal or insertion of the core of the desired sizes.

As the concrete charge C accumulates in the mold rod 31 constantly changes its position in the slide 30 which latter is provided with any suitable frictional clutch device enabling the gripping of the slide on the tamper rod 31 irrespective of the change of position of the rod in the slide as the filling proceeds.

The re-inforcing wire 3 is supplied from a reel 35 arranged at any suitable point and the wire is passed between a pair of feed rolls 36 arranged on a suitable support 37 to run into a guide tube 38 on the lower end of which is slidably mounted another guide tube 39 sliding through bearings 40 or frame, the lower end of the tube 39 being turned as at 39ª to form a nozzle resting on the top of the cement as it is filled into the chamber and the re-inforcing wire is thus laid in the body of the cement and the tube 39 is automatically elevated as the material accumulates in the chamber, the means comprising a flexible line or cable 41 attached to the upper end of the tube 39 and led over suitable pulleys 42 and down to a pulley 43 arranged on an arm of the frame 21. Extending upwardly from this arm is a guide 44 in which runs a slide 45, to which the adjacent end of the line 45 is attached. The slide has an outwardly extending tappet 46 disposed in the path of the upper end of the tamper rod 31. Thus the tamper rod moves upwardly engaging tappet 46 to force the slide 45 upwardly and by means of the line 41 lifts the wire feeding pipe 39. The tappet 46 slides in a guide sleeve 47 that is open on one side to receive the tappet. The weight of the guide tube 39 and its associated parts may be counterbalanced through means of a weight 48 attached by a line 49 passing over suitable pulleys 50, to the upper end of the tube 39.

By reference to Fig. 2 it will be noted that the rotation of the mold causes the re-inforcing element to be laid upon the plastic material immediately after it is supplied to the mold, and before the tamping head operates upon the newly laid plastic material.

The re-inforced tube may also be manufactured in a form of apparatus shown in Fig. 4 in which the outer mold 60 is stationary and into which extends a compressing paddle or device including whippers 61 on shaft 62 concentric with the shell 61. The material is introduced into the mold 60 while the compressing device 61 is rotated and the material is compressed against the surface of the mold chamber. Meanwhile the re-inforcing wire 35 is led down and laid on to the surface of the cement as it builds up the tube 2'.

Various changes may be made without departing from the spirit of my invention as claimed.

What is claimed is:

1. The combination in an apparatus for molding cement structures, of a rotatable mold, means for introducing plastic material to said mold during rotation of the same, tubular telescopic means for introducing a reinforcing wire into the mold chamber subsequent to the introduction of the plastic material, means for subsequently tamping the plastic material, means actuated by the up-strokes of the tamping means for elevating a part of the telescopic wire introducing means, and means for counterbalancing the weight of the movable part of the telescopic wire introducing means.

2. An apparatus for continuously laying a helical re-inforcing element in a cement pipe while it is being molded, which apparatus comprises, in combination with a mold for forming the pipe, a telescopic wire guide having a vertically movable discharge end extended into the mold; feed rollers for supplying the wire to the movable portion of the wire guide; and means for automatically elevating the guide as the length of the pipe increases during the molding of the same.

3. The combination in an apparatus for molding cement pipes of a mold; tamping means operative in the mold to pack the plastic material as it is introduced; and a tubular telescopic means for introducing a re-inforcing wire into the mold chamber to form a helix in the cement while it is being packed, the lower portion of said wire introducing means being elevated by the up-strokes of the tamping means.

4. The combination in a cement pipe making apparatus, of a mold having a tamping or compressing device; means for rotating the mold and the tamping device relatively; telescopic means for leading a re-inforcing wire into the mold chamber so as to be laid helically in the packed cement; the movable part of said means for introducing a wire having a flexible connection for elevating the same; means operative by the tamping device arranged to engage the flexible connection for elevating the wire feeding means during the filling of the mold and means for counterbalancing the weight of the movable part of said telescopic wire introducing means.

5. In a reinforced concrete pipe machine, a mold, a tubular member occupying a fixed position above said mold, a tubular member arranged for sliding movement upon said fixed tubular member and extending downwardly into the mold, which fixed and tubular members constitute means for guiding a flexible reinforcing member into the mold, means above the fixed tubular member for feeding a reinforcing member through said tubular members, means for automatically elevating the lower tubular member as the mold is filled, and means for counterbalancing the weight of said lower tubular member.

6. In a reinforced concrete pipe machine, a mold, a tubular member occupying a fixed position above said mold, a tubular member arranged for sliding movement upon said fixed tubular member and extending downwardly into the mold, which fixed and tubular members constitute means for guiding a flexible reinforcing member into the mold, means above the fixed tubular member for feeding a reinforcing member through said tubular members, means for automatically elevating the lower tubular member as the mold is filled, means for counterbalancing the weight of said lower tubular member, and a reciprocating tamper arranged for operation within said mold.

In testimony whereof we have signed our names to this specification.

BURROWS J. PRIMMER,
JOSEPH L. HALSTEAD.